Jan. 5, 1937.   J. F. KOCA   2,066,981
LAMP
Filed Nov. 22, 1934   4 Sheets-Sheet 2
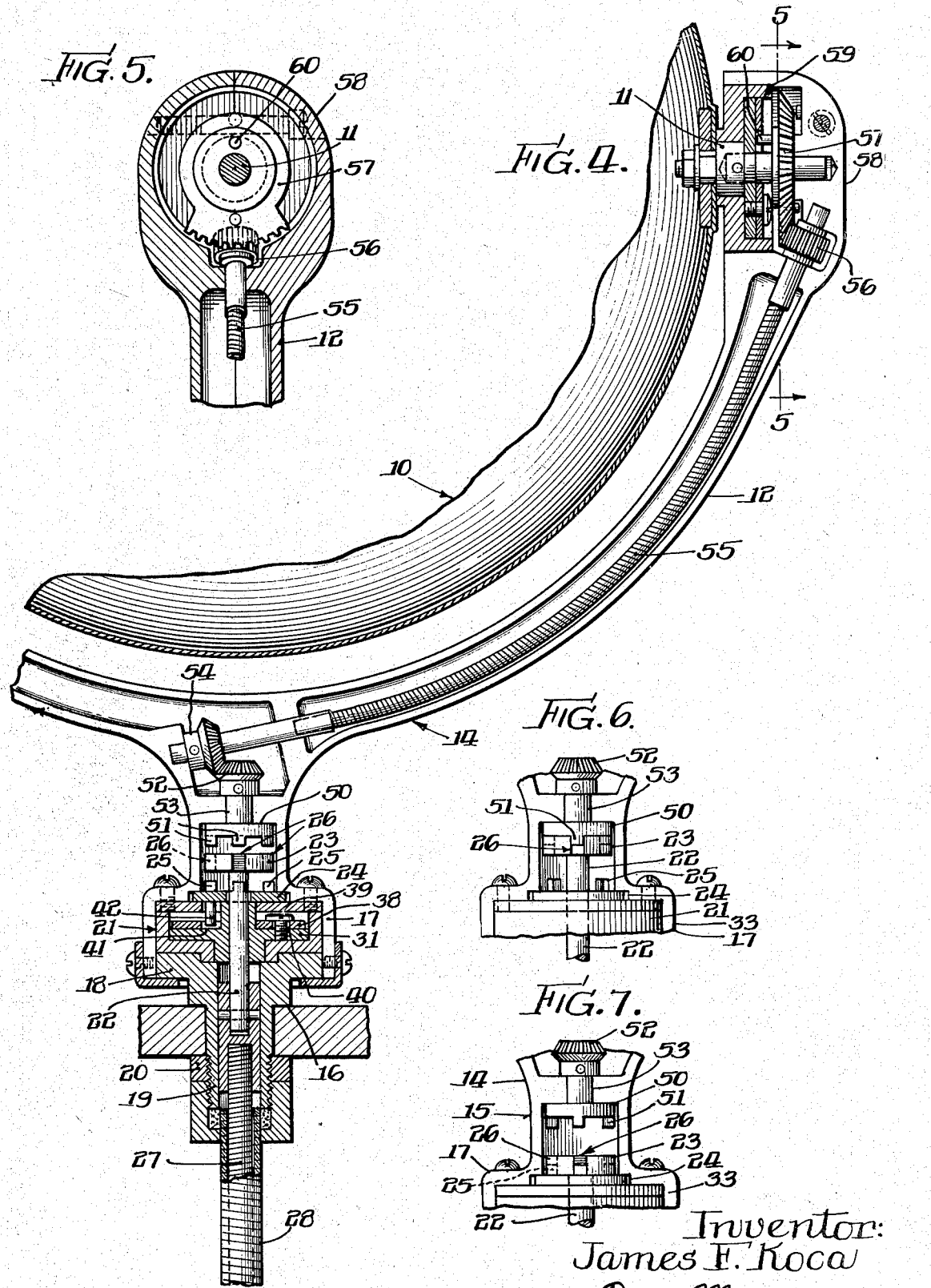
Inventor:
James F. Koca
By: Cox & Moore attys.

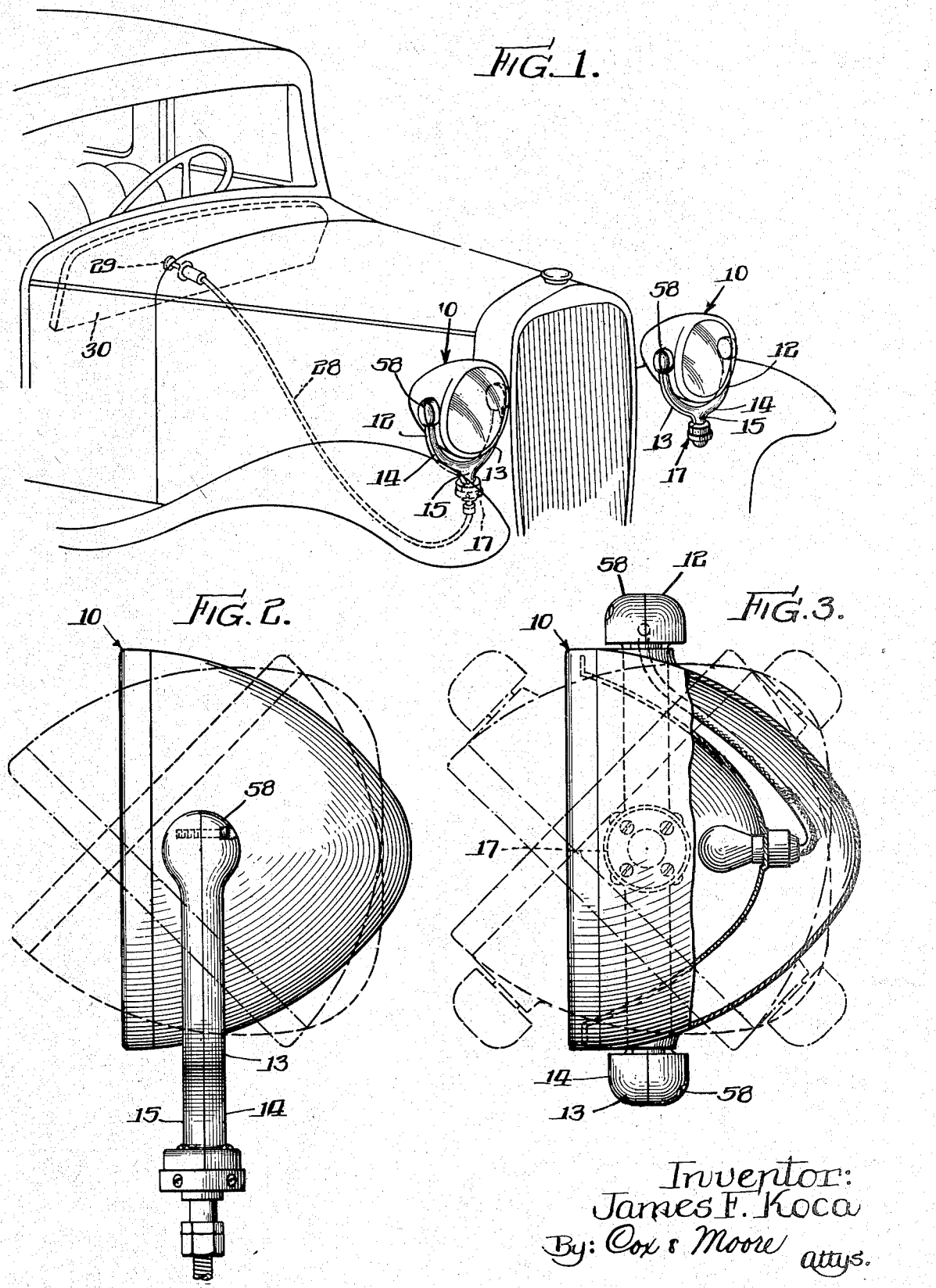

Jan. 5, 1937.    J. F. KOCA    2,066,981
LAMP
Filed Nov. 22, 1934    4 Sheets-Sheet 3
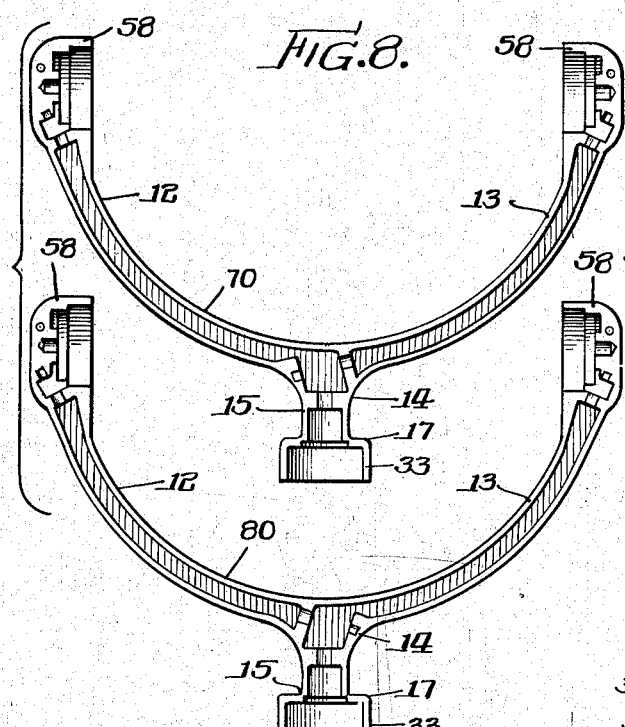
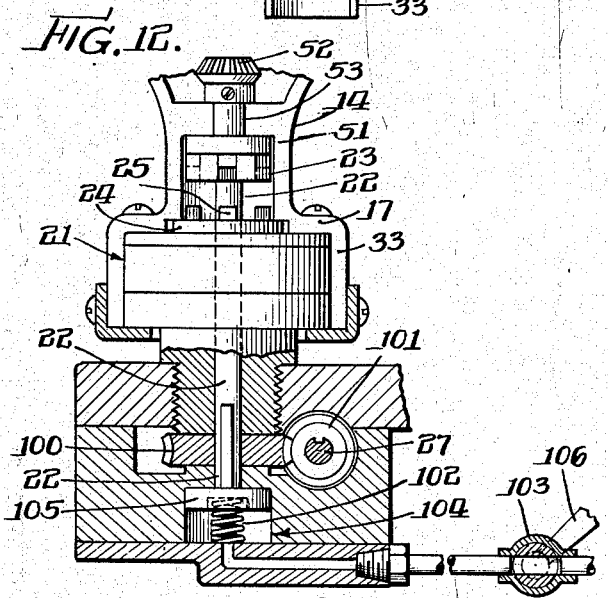
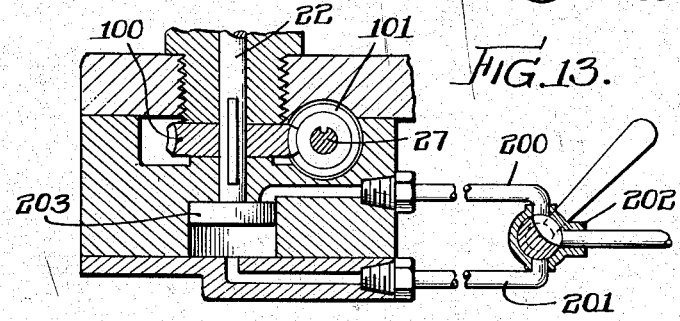
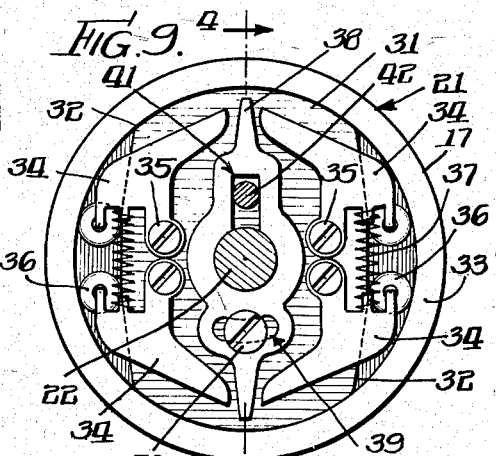
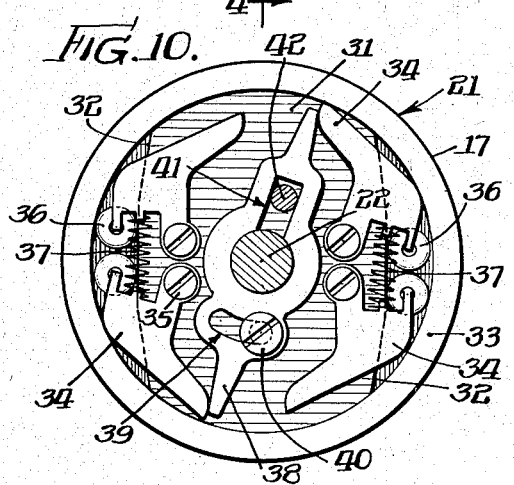
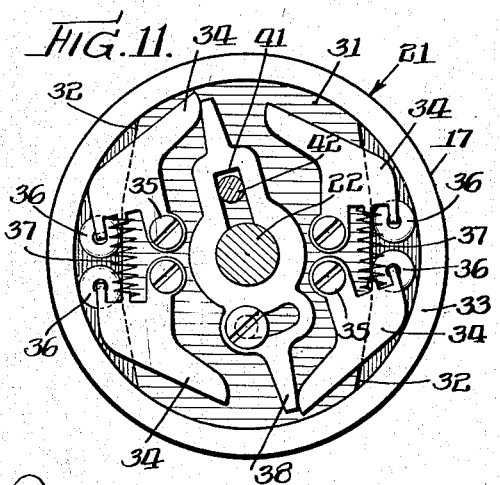
Inventor:
James F. Koca
By: Cox & Moore attys.

Jan. 5, 1937. J. F. KOCA 2,066,981
LAMP
Filed Nov. 22, 1934 4 Sheets-Sheet 4

Inventor:
James F. Koca
By: Cox & Moore
attys.

Patented Jan. 5, 1937

2,066,981

UNITED STATES PATENT OFFICE 2,066,981

LAMP

James F. Koca, Woodstock, Ill., assignor to Richard W. Sears, II, Woodstock, Ill.

Application November 22, 1934, Serial No. 754,212

6 Claims. (Cl. 240—61.13)

This invention relates to lamps in general, and particularly to a lamp mounting and lamp operating means. More specifically the invention relates to a lamp applied to a vehicle, such as an automobile, the lamp being mounted upon or recessed in an automobile fender or part.

An important object of the invention is the provision of a lamp which is adapted to be mounted on a part of a vehicle, such as an automobile, and which is provided with new and improved means operated from the dashboard of a vehicle for moving the lamp throughout a plurality of angular positions about vertical and horizontal axes; also the provision of means for locking the lamp in any one of its adjusted positions to prevent movement or shifting of the lamp during vibration or jars.

Another object of the invention is to provide new and improved locking or friction brake means for locking a shiftable lamp in any one of a plurality of positions.

A further object of the invention is to provide new and improved means for controlling the operation of the lamp.

Still another object of the invention is the provision of an improved lamp supporting bracket or yoke, which bracket or yoke is made in two parts, each of which is a duplicate, thereby permitting quick and easy assembly of the parts for controlling the movement of the lamp.

Still another object of the invention is to provide a lamp and means for operating the lamp whereby an ordinary headlight of an automobile may be controlled and operated or shifted vertically about a horizontal axis and horizontally about a vertical axis to focus the light at any desirable angular position, thereby making it readily advantageous for night driving, the light being capable of being directed forwardly and along the side of the road, thereby permitting the road to be easily seen, and further to alleviate the disadvantage of having a beam of light directed across the vision of the driver such as is inherent in the conventional spotlight.

A still further object of the invention is the provision of a lamp recess or well in a part of the hood or fender of an automobile in combination with means for moving the lamp out of its nested position and for moving the lamp through a plurality of angular positions about its vertical and horizontal axes.

Numerous other objects and advantages will be apparent throughout the progress of the following specification.

The accompanying drawings illustrate one selected embodiment of the invention, and the views therein are as follows:

Fig. 1 is a detail perspective view of an automobile and having the invention applied thereto.

Fig. 2 is a detail side elevation of one of the lamps and embodying the invention showing the manner in which the lamp may be moved through various angles about a horizontal axis.

Fig. 3 is a detail top plan view of one of the lamps and embodying the invention showing the manner in which the lamp may be moved through various angles about a vertical axis.

Fig. 4 is a detail vertical sectional view through the lamp supporting bracket or yoke showing the means for shifting the lamp throughout a plurality of angular positions about its horizontal and vertical axes and the means for locking the lamp in its adjusted position, said section being taken on the line 4—4 of Fig. 9.

Fig. 5 is a detail sectional view on the line 5—5 of Fig. 4 showing a modified form of gear.

Fig. 6 is a detail sectional view showing certain of the operating parts in meshed position for moving the lamp about its horizontal axis.

Fig. 7 is a view similar to Fig. 6 but showing certain of the operating parts in meshed position for moving the lamp about its vertical axis.

Fig. 8 is a detail plan section of the two parts which form the yoke or support of the lamp.

Fig. 9 is a detail plan section showing the friction or clutch means for locking the lamp in its adjusted position, the parts in this figure being shown in their normal or neutral position.

Fig. 10 is a view similar to Fig. 9, but showing the parts in operative position to permit rotation in one direction.

Fig. 11 is a view similar to Fig. 10, but showing the parts in operative position to permit rotation in an opposite direction.

Fig. 12 is a detail sectional view showing a modified arrangement for shifting parts of the mechanism by a vacuum line connection from the manifold.

Fig. 13 is a view similar to Fig. 12, but showing the vacuum connection to both sides of the plunger.

Figure 14:
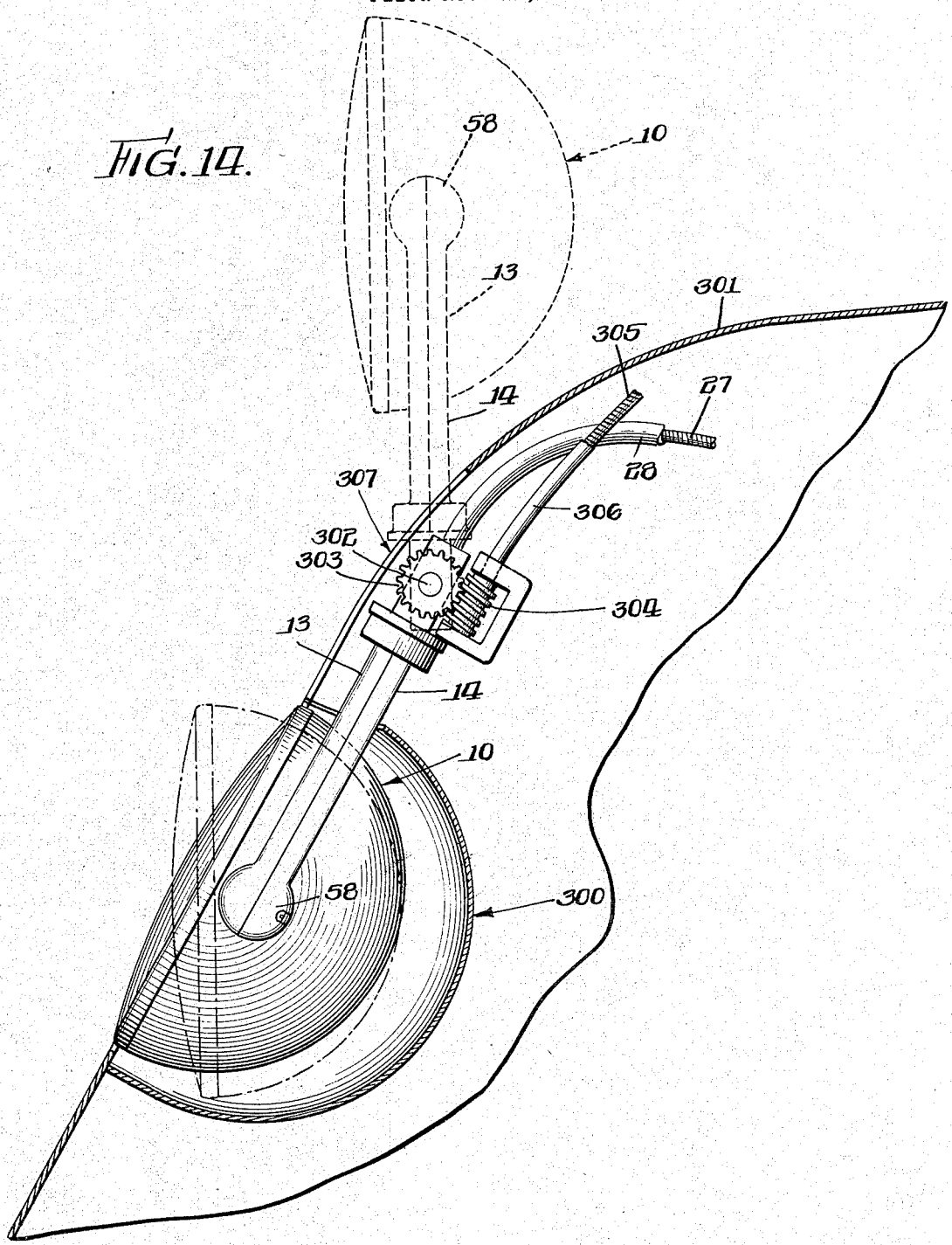
Fig. 14 is a detail sectional view showing the lamp normally seated within a socket or well formed in a part of the hood or fender.

The lamp and its operating structure, shown for the purpose of illustration to describe the invention, may comprise a lamp casing 10 of a conventional form including a reflector, a lens, an electric light globe and other associated parts for reflecting a beam of light. While two headlights are ordinarily used on an automobile, the construction and operation of each headlight is exactly the same. Therefore, only one headlight and its operating structure and mechanism will be described.

The casing 10 is provided with side trunnions 11 which are pivotally supported at each side to the arms 12 and 13 of a hollow cradle frame or support 14. This frame or cradle support 14 has a stem 15 integrally connected with the arms 12 and 13 and into which the arms merge. The stem or base 15 is pivotally mounted on a vertical axis 16, Fig. 4, whereby the lamp may be shifted from side to side as regards the vertical axis as well as shiftable about its horizontal axis, the horizontal axis comprising the axes of the trunnions 11.

The lower end of the stem 15 is provided with an enclosing casing portion 17 which is rigid with the cradle frame and which is adapted to rotate about a bearing 18. The bearing 18 is rigid with the attaching portion 19 which is rigidly fastened to a fender or other supporting part of an automobile. A nut 20 holds the parts in locked position relative to the member which supports the lamp and its supporting frame or cradle.

The housing 17 receives a clutch, member 21 of which is rigidly connected to the bearing 18. A vertical shaft 22 passes through the bearing member 18 and clutch member 21 and is rigidly connected to a shifting member 23. The shifting member 23 is adapted to have interlocking engagement with a disk 24. The disk 24 is provided with upstanding ears or lugs 25 which are adapted to register and cooperate with openings 26 provided in the shifting member 23. A flexible shaft 27, arranged in a supporting flexible cable 28, is rigidly connected to the vertical shaft 22 and is adapted to move the shifting member 23 into and out of operation with the disk 24.

A hand controlled knob 29, preferably mounted on the dash or instrument board 30 of an automobile, is fixed to the opposite end of the flexible shaft 27 for bringing the shifting member 23 into and out of engagement with the disk 24. Thus, when the knob 29 is pulled outwardly, the flexible shaft 27 will move a distance sufficient to bring the shifting member 23 into operative locking engagement with the disk 24, causing the ears or fingers 25 to nest in the receiving openings 26 provided in the shifting member 23. Rotative movement of the hand controlled knob 29 causes rotative movement of the flexible shaft 27 and, therefore, when the shifting member 23 and the disk 24 are in locked engagement, this rotative movement of the flexible shaft 27 will cause the cradle or lamp frame 14 to be shifted about its vertical axis.

It is desirable and advantageous that means be employed for preventing shifting of the lamp about its vertical axis except when it is desirable to do so. In other words the lamp should not vibrate or move on its axis during vibrations or jars of the automobile, but of course the lamp should be provided with means for manually moving the lamp through various angles. The clutch mechanism, therefore, is employed to prevent unauthorized or accidental movement of the lamp about its vertical axis. This clutch mechanism comprises a disk 31, member 21, Figs. 9 to 11, which are arranged inside of the housing 17 and are mounted upon the bearing 18, member 21 of the clutch is rigid with the bearing 18. The opposed edges of the disk are flattened at 32 to form relatively straight runways as shown in Figs. 9 and 10. The housing 17 is provided with an overhanging flange or ring 33 which engages the outer periphery of the disk 31. A plurality of dogs 34 are pivotally secured to the face of the disk 31 by means of screws 35. The dogs are arranged in pairs, as shown in Figs. 9 to 11, and are adapted for mutual cooperation. Each dog is provided with a roller 36 which extends into the opening between the edge 32 of the disk 31 and the inner periphery of the casing flange 33. Coil springs 37 arranged between each pair of dogs 34 urge their respective rollers 36 away from one another and into the bights between the runways 32 and the inner surface of the flange 33. These springs 37 thus form a clutch for holding the housing 17 against rotation relative to the disk 31. Thus rotation of the knob 29 causing rotation of the flexible shaft 27, will cause this rotation to be transmitted through the shaft 22, disk 31 and shifting member 23 and then to the plate or disk 24. A lever plate 38 is operatively connected to the disk or member 31 through the slot and pin connection 39, 40. The lever plate 38 is provided with an opening or slot 41 to receive a pin 42 which is on the member 24. There is enough lost motion between the slot and pin connection 39, 40 to allow the lever plate 38 to release the dogs 34 so that the member 31 can be rotated free of the clutch housing. Therefore, after the operating knob 29 on the dash 30 is pulled outwardly away from the dash to cause engagement of the shifting member 23 and the disk 24 and then the knob rotated, the rotative movement will be translated from the flexible shaft 27 through the shaft 22 to the shifting member 23. The member 23 transmits this motion to the member or disk 24 and the pin 42 to release the dogs from clutching engagement. Continued rotative movement of the flexible shaft 27, after the dogs are released, will be translated to the plate 38 which, being connected to the frame by the pin 40, will cause rotative movement of the frame in either direction. The device is so constructed that when the knob 29 is turned to the right, the beam of light from the lamp will shift toward the left, and when the knob is turned to the left, the beam of light will shift to the right.

A similar construction is provided for shifting the lamp on its horizontal axis to direct the beam of light either upwardly or downwardly, Fig. 4. This arrangement, shown in that figure, comprises a disk 50 which is similar to the disk 24, and like the disk 24, the disk 50 is adapted to have cooperation with the member 23. The member 23 is brought into engagement with the disk 50 by pushing inwardly on the knob, causing the flexible shaft 27 to move the member 23 into engagement with the member 50. Fingers or projections 51 on the member 50 are adapted to be received and become nested in the openings 26 in the member 23. Rotation of the knob will cause a bevel gear 52, which is rigidly connected with the member 30 by a rod 53 to rotate also. The bevel gear 52 is in engagement with a bevel gear 54 which is rotatably arranged in the arm 12 of the hollow cradle support or yoke 14. A flexible shaft 55 is rigidly connected with the gear 54 and extends upwardly into the arm 12, being connected at its upper end to a gear 56. This gear 56 is in engagement with a gear 57 revolubly mounted in a casing 58. The gear 57 may be a crown gear as shown in Fig. 4, or it may be a segment gear as shown in Fig. 5.

Clutch mechanism, designated generally by the numeral 59, is arranged in the casing 58 and constitutes a clutch mechanism exactly in accordance with the clutch and brake mechanism previously described as relating to the horizontal shifting of the frame about its vertical axis and as shown in Figs. 4, 6, 7, and 9 to 11.

When it is desired to shift the lamp about its horizontal axis, the knob 29 is pushed inwardly, causing engagement of the member 23 with the member 50. Rotative movement of the knob causes the gears 52, 54, 56 and 57 to rotate, and after freeing the dogs of the clutch, the member or pin 60 on gear 57 will cause rotation of the clutch mechanism 59 and rotate the lamp on its horizontal axis. As aforementioned, the clutch and brake mechanism herein used is the same as the clutch mechanism previously described and as shown in Figs. 4, 6, 7 and 9 to 11.

The parts are so constructed and arranged so that when the knob is pushed inwardly and turned to the right, the beam of light will be shifted toward an upward position, and when the knob is turned to the left, the ray or beam of light will be shifted toward a downward position. When the knob 29 is pulled outwardly and turned to the right, the beam of light will be shifted toward a position to the left of the automobile, and when the knob is turned to the left, the beam or ray of light will be shifted toward a position to the right of the automobile.

The invention, therefore, contemplates the operation of a lamp through various angles either about a horizontal or a vertical axis, both being accomplished by either pushing in or pulling out of the knob and the rotation of the knob.

The two clutches are provided to hold the lamp immovable so that the lamp cannot shift from its set position unless the knob is positively operated. One clutch holds the lamp from inadvertently moving about its vertical axis, while the other clutch holds the lamp from inadvertently moving about its horizontal axis. The two clutch mechanisms are provided to prevent the parts from accidently shifting or jarring loose. These clutch mechanisms, therefore, hold the lamp rigidly and prevent accidental mobility. Manual and deliberate operation only of the handle or knob selectively releases either clutch.

The wiring to the electric lamp inside of the casing can very conveniently be arranged inside of the tubular support 14, particularly through the arm 13 thereof which is left free, as only one clutch on one side of the lamp is sufficient to steady the lamp on its horizontal axis. The wiring can then pass through an opening provided in this arm and pass into an appropriate opening provided in the casing.

An expedient in manufacture is to make the cradle support 14 in two halves 70 and 80, Fig. 8. These two halves are exactly alike in construction and, therefore, can be easily formed or cast. When arranged together, the two parts form a single cradle yoke 14. The parts used can be readily and quickly arranged in position, and the construction permits quick assembling and disassembling of the parts.

In Figs. 12 and 13 there are shown modifications for controlling and causing operation of the lamp. In these latter figures a worm wheel 100 is fixed to the shaft or spindle 22 and this worm wheel is driven by a worm 101. The worm 101 is rigidly connected to the flexible shaft 27. Therefore, the flexible shaft 27 is always in connection with the worm 101, and the worm 101 is always in connection with the worm gear 100.

The worm gear 100, in turn, is always in connection with the shifting member 23 and the other cooperating mechanism. The parts are normally in engagement due to the fact that a spring 102, Fig. 12, urges them upwardly into engagement. Therefore, rotation of the knob 30 will cause the lamp to shift on its horizontal axis. However, it is desirable to arrange the parts so that they can rotate the lamp on its vertical axis also. A valve 103, preferably mounted on the dash 30, is provided to allow the vacuum to come in from the automobile intake manifold. The valve 103 is in operable communication with a cylinder chamber 104 in which there is arranged a piston or plunger 105 rigid with the shaft 22, the spring 102 being arranged under the plunger 105. When the valve 103 is in open position, a suction is created in the cylinder and the suction plunger 105 on the end of the shaft 22 is sucked down. Therefore the mechanism for controlling the movement of the lamp about the horizontal axis is disconnected, and the mechanism controlling the movement of the lamp about the vertical axis is connected. When the lever 106 of the valve 103 is operated so as to admit the vacuum, and the knob 29 is rotated, the lamp will be caused to turn about its vertical axis.

Instead of using a vacuum for moving the plunger in one direction and a spring for moving the plunger in the opposite direction, vacuum means may be provided for controlling the movement of the parts in both directions. The device shown in Fig. 13 is used to accomplish this latter purpose and two lines 200 and 201 leading from the manifold to the chamber are provided, the spring 102 being omitted. Therefore, if the three-way valve 202 is operated to open one line and close the other line, the plunger 203 will be drawn upwardly, permitting movement of the lamp about its horizontal axis. Operation of the valve 202 in the other direction to close the first line and open the other will cause the plunger 203 to be sucked downwardly, disconnecting the parts for operation about the horizontal axis, and connecting the parts for operation about the vertical axis.

In Fig. 14 there is shown a lamp nested in a recess 300 formed in a part of the body, such as the fender or hood 301, of an automobile.

The lower part of the lamp bracket or yoke 14 is pivoted on a pin 302, whereby the lamp is free to pivot about the pivot pin 302. A gear 303 is rigidly connected to a part of the yoke support 14, and has meshing relationship with a gear 304, which is revolubly fixed in bearings suitably connected to a part of the automobile. The gear 304 is rigidly connected to a cable 305 which leads to the dash of an automobile. The cable 305 is mounted inside of the sheath 306. The construction, therefore, permits the lamp to be either swung out of its socket 300 as shown in full lines in Fig. 14, or to a vertical upright position as shown in dotted lines in Fig. 14. The lamp is provided with the means previously described and controlled by the cable 27 to shift the lamp either vertically about a horizontal axis or horizontally about a vertical axis. The construction, therefore, in Fig. 14, contemplates a lamp mounted in a socket in a part of an automobile body whereby the lamp may be shifted to direct a beam of light through various angles either vertically or horizontally. Also, the lamp may be raised from its socket as shown in dotted lines in Fig. 14 and still be controlled by the knob 29 for shifting the lamp vertically or horizontally as previously described. In cases where the lamp is nested within the recess 300 as shown in Fig. 14, the body may be provided with a receiving recess 307 to accommodate the cradle 14 when the lamp is in the position shown in full lines.

The invention provides means for swiveling a lamp about a vertical axis as well as about a horizontal axis, thereby rendering the conventional automobile headlight capable of various movements, similar to the operation of the ordinary spotlight. In other words, the automobile headlight as well as having its normal function and operation, is provided with additional mechanism to perform the function of an ordinary spotlight. Furthermore, the lamp may be nested into a receiving recess in the automobile body, and if and when required, it can be removed from its recess and maintained in an upright position by the mere rotation of a knob on the dash. Additional means are also provided for controlling the swivel movement of the lamp about its axes by the vacuum obtained from the automobile manifold. It may be said, therefore, that the invention comprises a universal adaptation for an automobile headlight to perform several lighting features to direct beams of light from the headlight through various angles.

The mechanism for controlling the operation of the lamp is relatively simple in construction, positive in operation, it can be readily assembled, and the invention is applicable to existing machines.

Changes may be made in the form, construction and arrangement of the parts without departing from the spirit of the invention or sacrificing any of its advantages, and the right is hereby reserved to make such changes as fairly fall within the scope of the following claims.

The invention is hereby claimed as follows:

1. The combination with a vehicle having a body, a lamp, a lamp support, said body being provided with a recess therein to receive the lamp and lamp support, gear mechanism for moving said lamp and lamp support into and out of said recess, said lamp being mounted on a vertical bearing member for rotative movement thereabout and also on a horizontal bearing member for rotative movement thereabout, brake means for preventing involuntary movement of the lamp about its vertical bearing member, additional brake means for preventing involuntary movement of the lamp about its horizontal bearing member, a single means controlled from the dashboard for selectively releasing either of said brake means and for rotating the lamp about either of its bearing members, and means also controlled from the dash for moving the lamp into and out of its recess.

2. An automobile headlight remotely situated from the cowl of an automobile comprising means controlled from the dash for rotating the lamp through various angles about a vertical pivot, said means comprising a horizontal bearing member secured to the lamp, a vertical bearing member supporting the lamp and the horizontal bearing member, two superposed driven clutch members, a flexible shaft operatively connecting one of said driven clutch members and the horizontal bearing member, the other driven clutch member being connected to the vertical bearing member, an intermediate driving clutch member mounted for rotative and for sliding movement between the driven clutch members and adapted to mesh with either whereby the lamp may be selectively rotated about its horizontal or about its vertical bearing member, and brake means controlled from the automobile dash to lock the lamp in any one of its adjusted positions and to prevent involuntary movement thereof.

3. An automobile headlight remotely situated from the cowl of an automobile comprising means controlled from the dash for rotating the lamp through various angles about a horizontal pivot, said means comprising a horizontal bearing member and a vertical bearing member for supporting the lamp, a rigid shaft journaled in bearings for rotative and sliding movement, a driving clutch member on said shaft, driven clutch members journaled on opposite sides of the driving clutch member and adapted to mesh therewith, one driven clutch member being operatively connected with the horizontal bearing member and the other driven clutch member being connected with the vertical bearing member, and brake means controlled from the automobile dash to lock the lamp in any one of its adjusted positions and to prevent involuntary movement thereof.

4. The combination with a vehicle having a body, said body being provided with a recess therein, of a lamp and a lamp support adapted to fit within said recess, said lamp support member comprising a pivoted bracket, means on said bracket for rotating the bracket and the entire lamp assembly into and out of said recess, auxiliary means adapted to rotate said lamp selectively about either a vertical or a horizontal bearing member, said means comprising a sliding shaft carrying a driving clutch member and two opposed driven clutch members located on either side of said driving clutch member, gear means at the outer end of the lamp bracket adapted to produce rotation of the lamp about a horizontal bearing member passing through the body of the lamp, said means being connected to one of the driven clutch members, and brake means coupled loosely to the other of the driven clutch members, said brake means having means thereon to engage the lamp bracket and hold the said rotation about the vertical bearing member.

5. The combination with a vehicle having a body portion and a pocket in said body portion, a lamp having a lens and casing, adapted to be nested in said pocket, and when in said pocket forming a substantial continuation of the surface of the body portion, means for moving said lamp into and out of said pocket into operative position, said means comprising a horizontal bearing member mounted in proximity to the pocket, a lamp support carried by the bearing member for movement in a vertical plane to bring the lamp out of the pocket into operative position, a gear operatively connected to said lamp support, means including a second gear remotely operable and connected to said first gear for moving the lamp and its support into and out of said pocket, a second horizontal bearing member carried by said lamp support and pivotally supporting the lamp, and means to rotate said lamp on said second horizontal pivot so as to have the lens face forwardly.

6. The combination with a vehicle having a front body portion and a pocket formed in said body portion, a lamp having a casing and lens nested in said pocket, and when in said pocket having the lens facing outwardly and forming a substantial continuation of the surface of the body portion, means for moving said lamp into and out of said pocket, said means comprising a horizontal bearing member mounted beneath the body portion, and in proximity to the pocket, a lamp support carried by the bearing member for movement in a vertical plane, to bring the lamp out of the pocket into operative position, a gear operatively connected to said lamp support, means including a second gear remotely operable and connected to said first gear for moving the lamp and its support into and out of said pocket, a second horizontal bearing member carried by said lamp support and pivotally supporting the lamp, and means to rotate said lamp on said second horizontal pivot so as to have the lens face forwardly.

JAMES F. KOCA.